US005972478A

United States Patent [19]

Farrow

[11] Patent Number: 5,972,478

[45] **Date of Patent: *Oct. 26, 1999**

[54] PERSONAL (ID) PIN LABELS

[75] Inventor: David Farrow, Trenton, Canada

[73] Assignee: Moore Business Forms, Inc., Grand Island, N.Y.

[ * ] Notice: Under 35 U.S.C. 154(b), the term of this patent shall be extended for 867 days.

[21] Appl. No.: 08/509,006

[22] Filed: Jul. 31, 1995

Related U.S. Application Data

[63] Continuation of application No. 08/163,745, Dec. 7, 1993, abandoned.

[51] Int. Cl.$^{6}$ .................................................. B32B 3/00

[52] U.S. Cl. ......................... 428/195; 428/202; 428/915; 428/916; 283/81; 283/101; 156/230; 156/247

[58] Field of Search .................................... 156/230, 247; 283/81, 101; 428/195, 915, 916, 202

[56] References Cited

U.S. PATENT DOCUMENTS

| | | | |
|---|---|---|---|
| 3,252,234 | 5/1966 | Goodman . | |
| 3,631,617 | 1/1972 | Pekko | 40/2.2 |
| 3,925,585 | 12/1975 | Aoyagi . | |
| 3,973,788 | 8/1976 | Pekko et al. | 282/19 R |
| 4,032,679 | 6/1977 | Aoyagi . | |
| 4,180,929 | 1/1980 | Schultz, Jr. . | |
| 4,278,199 | 7/1981 | Tanaka . | |
| 4,398,985 | 8/1983 | Eagon . | |
| 4,742,954 | 5/1988 | Shishido . | |
| 4,911,477 | 3/1990 | Shishido . | |
| 5,324,380 | 6/1994 | Marin | 156/247 |

FOREIGN PATENT DOCUMENTS 0341328 11/1989 European Pat. Off. .

*Primary Examiner*—William Krynski
*Attorney, Agent, or Firm*—Nixon & Vanderhye P.C.

[57] ABSTRACT

Label assemblies are produced which obscure confidential information that is part of each label assembly, while allowing ready exposure of the confidential information in a tamperproof manner. A web of label components having a face ply with a top surface, underlying pseudo adhesion layers, an underlying image ply, an underlying adhesive layer, and a bottom release paper carrier ply are acted upon to non-impact print a security pantograph and readable indicia on the web face ply, and with an impact element generate a confidential information image on the image ply, which image is not visible from the face ply. Labels are die cut out of the web and matrix material formed by die cutting is removed so that the web then includes a bottom release paper carrier ply with a plurality of spaced labels, each having a confidential information image. The labels may be applied to a mailer or other substrate. A plurality of slits and/or perforations are formed in the face ply and one pseudo adhesion layer, including through the readable indicia, to facilitate the tamperproof functionality of the labels, the security slits and perforations typically including a plurality of generally L-shaped slits, at least one longitudinal slit, at least one longitudinal perforation, and a diagonal slit forming a triangularly shaped portion of the face ply having printing of a distinctly different color than the security pantograph.

20 Claims, 3 Drawing Sheets

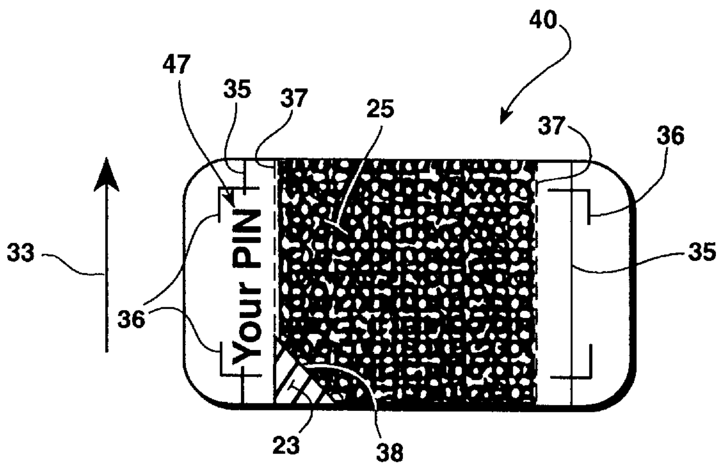
Fig. 4
Fig. 5
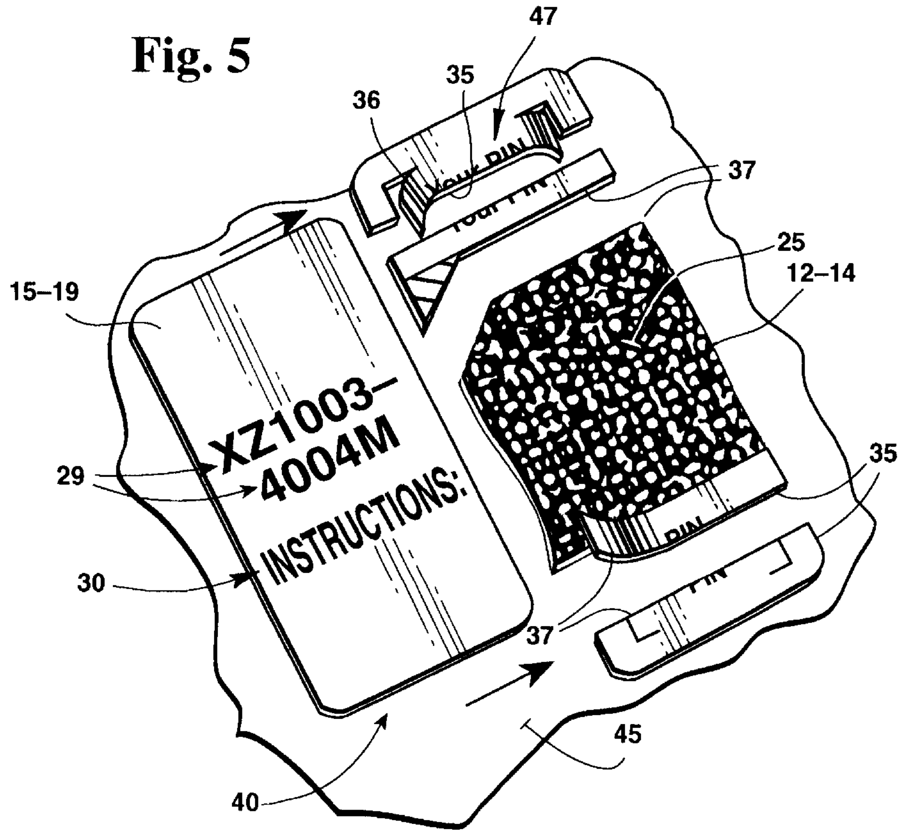

PERSONAL (ID) PIN LABELS

This is a continuation of application Ser. No. 08/163,745, filed Dec. 7, 1993, now abandoned.

BACKGROUND AND SUMMARY OF THE INVENTION

There are many situations in which it is desirable to transmit, via documents, highly confidential information, such as a PIN through the mail. When such information is printed, it is of course necessary that the information not be visible except when exposed by the user, and there must be some mechanism for identifying to the user if the information has been tampered with so that the PIN can be cancelled and a new PIN issued.

According to the present invention, a tamperproof label assembly for camouflaging or clearly evidently displaying confidential indicia is provided, as well as a method of producing label assemblies obscuring confidential information that is part of each label assembly, while allowing ready exposure of the confidential information in a tamperproof manner. The invention achieves its objectives by using conventional pseudo adhesion layers as part of the label so that once the label components have been separated, to expose the PIN, it is virtually impossible to lay the elements back together in the manner that they were originally provided. The desirable objectives are also facilitated, however, by forming slits and/or perforations in the face layer of the label assembly which cause the label assembly to come apart when the PIN is exposed, making it even more difficult to properly lay the various elements back together again without exposing the tampering, and this is even more particularly facilitated when readable indicia is printed on the top surface of the face ply and at least one slit or perforation extends through the readable indicia.

The invention also ensures confidentiality by providing security pantographs on the label face plies so that the underlying PIN cannot be read, the security pantographs typically provided by first printing in black or blue ink, and then printing with the other of those colors. Also, the slits form a triangularly shaped element in the face ply of a distinctly different color (e.g. red) from the security pantographs which allows ready access to the components for separating various plies and layers at the pseudo adhesion layers.

To facilitate easy production of the label assemblies according to the invention, each label assembly typically includes an image ply on which the PIN is generated. The image is formed on the impact ply by applying an uninked impact printing element (stylus) to the top surface of the face ply, while the security pantographs are applied to the face ply by non-impact printing (e.g. printing plates), so as not to form images on the underlying impact ply.

According to one aspect of the present invention a method of producing label assemblies is provided comprising the following steps: (a) Producing a web of label components having a face ply with a top surface, underlying pseudo adhesion layers, an underlying image ply, an underlying adhesive layer, and a bottom release paper carrier ply. (b) Acting on the web face ply to non-impact print a security pantograph thereon. (c) Acting on the web face ply with an impact element to generate a confidential information image on the image ply, which image is not visible from the face ply. And, (d) die cutting labels out of the web, and removing matrix material formed by die cutting so that the web then comprises the bottom release paper carrier ply with a plurality of spaced labels thereon, each having a confidential information image therein.

The method also preferably comprises the further steps of imaging readable indicia on the face ply (not overlying the confidential information image), and forming a plurality of slits and/or perforations in the face ply and one pseudo adhesion layer, including through the readable indicia, to facilitate the tamperproof functionality of the labels. The first security pantograph is typically printed in black or blue ink, and then the security pantograph is printed in the other of blue or black ink. A diagonal slit forms a generally triangularly shaped element in the face ply which preferably is printed with a distinctly different color, such as red, and which is readily (and easily discernible) removed to allow access to the face ply to separate the pseudo adhesion layers.

According to another aspect of the present invention a tamperproof label assembly is provided comprising the following elements: An image ply having top and bottom surfaces, the top surface for generating an image in the form of confidential indicia when impacted with an impact printer stylus. Permanent adhesive operatively associated with the bottom surface of the image ply. A face ply having top and bottom surfaces, and having a security pantograph imaged on the top surface thereof. And, pseudo adhesion layers disposed between the face ply bottom surface and the image ply top surface for releasably holding the face and image plies together, but when separated exposing the image ply top surface without damage thereto, and once separated not capable of re-adhesion in as effective a manner as prior to separation.

Confidential indicia is imaged on the top surface of the image ply. The assembly also typically comprises security slits and/or perforations formed on the face ply and one of the pseudo adhesion layers for effecting separation of the portions of the second face ply when pseudo adhesion layers are separated, precluding effective reattachment of the pseudo adhesion layers when separated due to that separation. The security slits may include a diagonal slit cooperating with a longitudinal slit and defining a triangularly shaped portion of the face ply, with the top surface of the triangularly shaped portion having printing thereon of distinctly different color (e.g. red) than the security pantograph. Readable indicia is typically imaged on the top surface of the face ply and at least one of the slits or perforations passes through the readable indicia causing the face ply to separate into different portions each containing only part of the readable indicia, when the pseudo adhesion layers are separated. The security slits and perforations may include a plurality of generally L-shaped slits, at least one longitudinal slit, and at least one longitudinal perforation.

Typically the label assembly also includes a liner ply between the bottom surface of the image and the permanent adhesive; a release sheet engaging the permanent adhesive; a permanent adhesive between the top surface of the image ply and one of the pseudo adhesion layers; and a permanent adhesive between the bottom surface of the face ply and one of the pseudo adhesion layers.

The invention also comprises a tamperproof label assembly comprising the following elements: An image ply having top and bottom surfaces, the top surface for generating an image in the form of confidential indicia when impacted with an impact printer stylus. A face ply having top and bottom surfaces, and having a security pantograph imaged on the top surface thereof. Pseudo adhesion layers disposed between the face ply bottom surface and the image ply top surface for releasably holding the face and image plies together, but when separated exposing the image ply top surface without damage thereto, and once separated not capable of re-adhesion in as effective a manner as prior to separation. And, security lines of weakness or parting formed in the face ply and one of the pseudo adhesion layers for effecting separation of portions of the face ply when the pseudo adhesion layers are separated, precluding effective reattachment of the pseudo adhesion layers once separated due to the separation.

It is the primary object of the present invention to provide for the effective transmission of confidential information, yet allowing ready exposure of the confidential information but in a tamperproof manner, i.e. so that if the confidential information is once exposed that is thereafter ever apparent. This and other objects of the invention will become clear from an inspection of the detailed description of the invention, and from the appended claims.

BRIEF DESCRIPTION OF THE DRAWINGS

FIG. 4 is a top plan view of one individual label assembly according to the present invention particularly illustrating the slits and perforations therein; and FIG. 5 is a top perspective view of the label assembly of FIG. 4 shown applied to a business form or other substrate, and showing the break up of the face ply and its connected pseudo adhesion layer after removal to expose the confidential indicia beneath it.

DETAILED DESCRIPTION OF THE DRAWINGS

Figure 1:
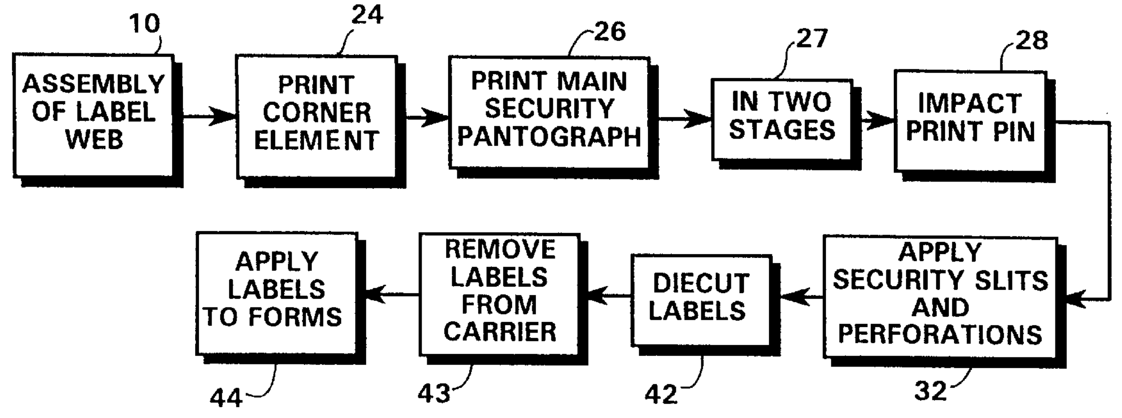
FIG. 1 is a box diagram indicating various method steps that may be performed in the practice of an exemplary method according to the present invention.
Figure 2:
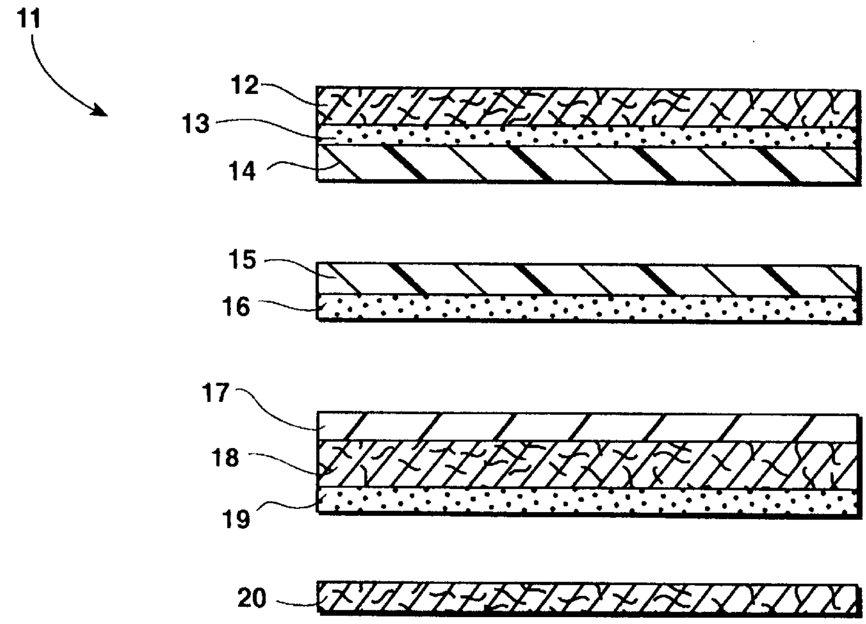
FIG. 2 is a side exploded view of an exemplary label assembly according to the present invention prior to formation into individual labels, with each of the plies or layers shown greatly exaggerated in thickness for clarity of illustration.

FIG. 1 schematically illustrates the various steps of an exemplary method according to the invention for the manufacture of label assemblies obscuring confidential information that is part of each label assembly, while allowing ready exposure of the confidential information in a tamperproof manner. The first step is the assembly of a label web, as indicated schematically by box 10 in FIG. 1, is the assembly of a label web, the label web typically having a construction as illustrated generally by reference numeral 11 in FIG. 2. The basic material forming the web stock may be, for example, 50 lb. electronic data processing (EDP) "Majic Film Image" web stock available from Technicote of Cuyahoga Falls, Ohio.

The components of the label stock 11 include, from top to bottom, a face ply 12, such as 50 lb. per ream EDP face stock, which is connected by a permanent adhesive layer 13 to a "coupon film" 14. The coupon film 14 is a pseudo adhesion layer, typically made of a plastic film which has adhesive properties with a like film, but when separated no longer properly adheres to its cooperating layer. A second pseudo adhesion layer is the transparent coupon film 15. Typical pseudo adhesion layers may be of the type disclosed in U.S. Pat. Nos. 4,398,985 and 4,911,477 (the disclosures of which are hereby incorporated by reference herein).

The stock 11 further comprises a transparent permanent adhesive layer 16 which secures the second coupon film 15 to an image ply 17. The image ply is, for example, a self-contained self-imaging coating for example on a piece of paper or may be of the type available from Fasson's Roll Division of Painesville, Ohio, such as sold under the name Litho Lite™/S-490/Ultra Fast Copy™, or Fas Data™/R-130/Ultra Fast Copy™. When the image ply 17, or overlying plies, are impacted with a non-inked stylus or other impact printing tool, the image develops on the layer 17 corresponding to the stylus. The image typically develops slowly and is not immediately visible upon printing (but would not be visible in any event since covered by the other plies or layers 12 etc.). The bottom surface of the image ply 17 is preferably adhered to or integral with the liner ply 18. Ply 18 is, e.g., having a permanent adhesive 19 on the bottom surface thereof, which adhesive 19 is covered with a release ply 20 that releasably adheres to the adhesive 19, the release ply 20 comprising a carrier for the other plies and layers of the stock 11.

The stock web 11 is supplied to a conventional printing press. On the printing press, a corner element (23 in FIGS. 3 through 5) is printed with a first printing plate, typically in a color that is readily visible (and distinct from subsequent from printing that will be applied), such as red ink. This printing step is illustrated schematically at 24 in FIG. 1. Then a security pantograph—25 in FIGS. 3 through 5—is printed with two different printing plates, typically in two different stages illustrated schematically at 26 and 27 in FIG. 1. This printing is not impact printing so that it will not have an affect on the image layer 17 underlying the face layer 12 to which the printing is applied. Typically, the printing of the pantograph in one of the two stages 26, 27 will be with blue ink, and the other with black.

After the stages 26, 27, the web is acted upon by an impact printer with a non-inked stylus, as indicated schematically at 28 in FIG. 1, which images the PIN 29 (see FIG. 5) and/or other confidential indicia. Non-confidential indicia, such as instruction indicia 30 illustrated in FIG. 5, may also be imaged at the same time. The image from the impact printer does not show on the top surface of the face ply 12 because the stylus is uninked, and also because of the security pantograph 25.

Also on press, various lines of weakness or separation, such as slits and/or perforations, are applied to cooperate with the pseudo adhesion layers 14, 15 in minimizing the chance that the final label assemblies produced could be tampered with, without the tampering being readily indicated (that is facilitating the tamperproof nature of the final label assemblies produced). The forming of the security slits and perforations is illustrated schematically at 32 in FIG. 1. For example, two longitudinal full length slits, in the direction of web travel (direction of arrow 33 in FIGS. 3 and 4) are provided by rotary slitters on the press. Remaining slits and perforations are made with specifically designed dyes. The slits and perforations extend completely through the plies and layers 12 through 14, and into the layer 15, but typically not through the layer 15. They extend into the layer 15 just enough, however, so that the impressions from the slits and perforations can be seen in the layer 15 once it is separated from the layer 14.

Exemplary slits and perforations that may be applied are illustrated most clearly in FIG. 4, where the slits and perforations are shown by dark lines. The longitudinal slits are the slits 35, whereas a plurality of generally L-shaped die cut slits 36 are also provided, preferably intersecting the slits 35. Perforation lines 37 are parallel to, and interior of, the longitudinal slits 35, and the diagonal slit 38 (intersecting one of the perforations 37) defines the generally triangularly shaped portion 23.

Figure 3:
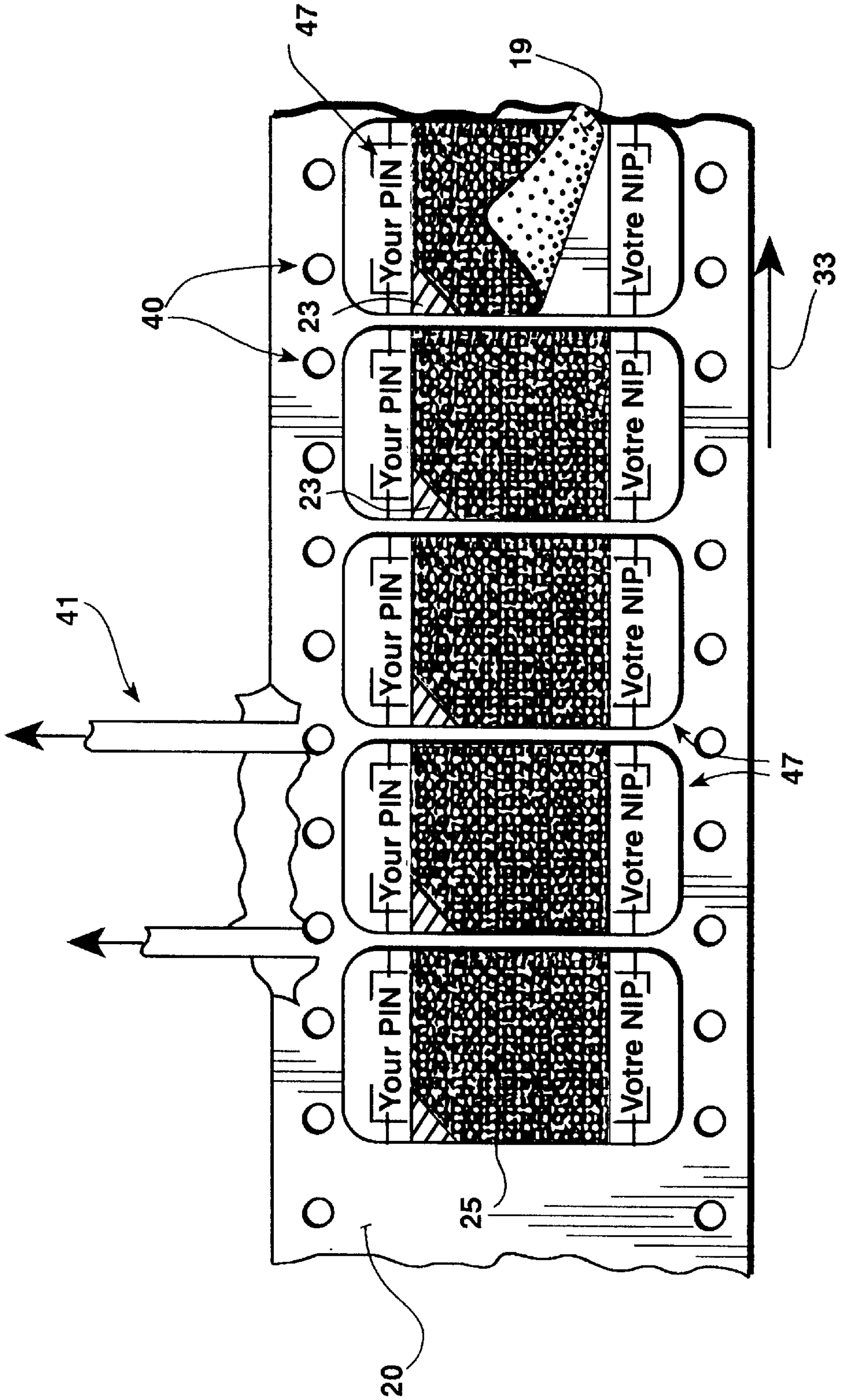
FIG. 3 is a top plan schematic view of a web of label assemblies according to the present invention.

After the security slits and/or perforations are applied at step 32, individual labels—shown generally by reference numeral 40 in FIGS. 3 through 5—are die cut out of the stock 11, and the matrix material—shown schematically in part at 41 in FIG. 3 (shown) in the act of removal—is removed, providing a web which then comprises the carrier web 20 (which is intact, not affected by the die cutting step 42), with a plurality of spaced labels 40 thereon.

FIGS. 4 and 5 illustrate a label 40 detached from the carrier 20, the labels 40 being readily removed either manually or automatically from the web 20 because of its release characteristics with respect to the permanent adhesive 19. The label removal step is illustrated schematically at 43 in FIG. 1. Then the labels 40 may be applied to business forms, or like substrates, as illustrated schematically at 44 in FIG. 1, the adhesive 19 permanently affixing the components 15 through 19 of the label 40 to the substrate, such as the mailer type business form 45 illustrated in FIG. 5.

In use of the labels illustrated in FIGS. 4 and 5, when the mailer 45 is received by the ultimate user, he or she first detaches the triangularly shaped piece 23 (which piece does not overlie the PIN 29), and after that grasps the main body of the label 40 components 12 through 14, between the perforation lines 37, and lifts it up, exposing the PIN 29 and the instructions 30. As the components 12 through 14 are lifted the pseudo adhesion between the layers 14, 15 is broken, meaning that it is very difficult to reapply and realign the layers 14, 15 to and with each other. Also, during exposure of the PIN 29, the perforations 37 and slits 35, 36, and 38 cause the break up of the components 12 through 14—as illustrated in FIG. 5—so that it is extremely difficult to put them back together without indication of tampering.

Another feature that may be utilized according to the present invention to facilitate the tamperproof nature of the labels 40 is the readable indicia 47 (see FIGS. 3 through 5) which may be printed on the upper surface of the face ply 12 during stages 26, 27. The printing 47 is positioned so that it is intersected by a slit or perforation, such as the slit 35, so that if the components 12 through 14 part at the slit 35 yet a further indication of tampering is provided since portions of the indicia 47 are on each side of the slit 35.

Other tamperproof facilitating features may also be provided according to the invention. For example, dyes may be provided in one or more of the adhesives 13, 16, 19 by the label stock manufacturer to provide coloring or tinting of the adhesives. Other conventional techniques may also be utilized. Further, while the method has been described with respect to FIG. 1 in a particular sequence, it is to be understood that the exact order of the steps illustrated in FIG. 1 is not in any way critical, and the steps may be practiced in a wide variety of orders. Also, the layers and plies 12 through 14 may be produced separately from the layers and plies 17 through 19, including complete printing of each, and then all of the components of the stock 11 assembled afterward for the practice of steps 32 and 42.

It will thus be seen that according to the present invention an advantageous method and label assembly have been provided, allowing the production of labels having confidential information which is obscured during transport, but is readily exposed in a tamperproof manner by the user. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. A tamperproof label assembly for camouflaging or clearly evidently displaying confidential indicia, comprising:

an image ply having top and bottom surfaces, said top surface for generating an image in the form of confidential indicia when impacted with an impact printer stylus;

permanent adhesive associated with said bottom surface of said image ply for connecting said bottom surface to another structure;

a face ply having top and bottom surfaces, and having a security pantograph imaged on said top surface thereof; and pseudo adhesion layers disposed between said face ply bottom surface and said image ply top surface for releasably holding said face and image plies together, but when separated exposing said image ply top surface without damage thereto, and once separated not capable of re-adhesion in as effective a manner as prior to separation.

2. An assembly as recited in claim 1 further comprising confidential indicia imaged on said top surface of said image ply.

3. An assembly as recited in claim 1 further comprising security slits and/or perforations formed in said face ply and one of said pseudo adhesion layers for effecting separation of portions of said face ply when said pseudo adhesion layers are separated, precluding effective reattachment of said pseudo adhesion layers once separated due to said separation.

4. An assembly as recited in claim 3 wherein said security slits include a diagonal slit cooperating with a longitudinal slit and defining a triangularly shaped portion of said face ply.

5. An assembly as recited in claim 4 wherein said top surface of said triangularly shaped portion of said face ply has printing thereon of a distinctly different color than said security pantograph.

6. An assembly as recited in claim 3 further comprising readable indicia imaged on said top surface of said face ply on a portion thereof not covered by said security pantograph, and wherein at least one of said slits or perforations passes through said readable indicia, causing said face ply to separate into different portions each containing only part of said readable indicia when said pseudo adhesion layers are separated.

7. An assembly as recited in claim 3 wherein said security slits and perforations include a plurality of generally L-shaped slits, at least one longitudinal slit, and at least one longitudinal perforation.

8. An assembly as recited in claim 1 further comprising a liner ply between said bottom surface of said image ply and said permanent adhesive; a release sheet engaging said permanent adhesive; a permanent adhesive between said top surface of said image ply and one of said pseudo adhesion layers, and a permanent adhesive between said bottom surface of said face ply and one of said pseudo adhesion layers.

9. An assembly as recited in claim 2 wherein said confidential indicia is a PIN, and further comprising readable indicia on said top surface of said face ply on a portion thereof not covered by said security pantograph indicating that a PIN is provided as part of said assembly.

10. An assembly as recited in claim 2 further comprising security slits and perforations formed in said face ply and one of said pseudo adhesion layers for effecting separation of portions of said face ply when said pseudo adhesion layers are separated, precluding effective reattachment of said pseudo adhesion layers once separated due to said separation.

11. An assembly as recited in claim 10 wherein said security slits include a diagonal slit cooperating with a longitudinal slit and defining a triangularly shaped portion of said face ply, and wherein said top surface of said triangularly shaped portion of said face ply has printing thereon of a distinctly different color than said security pantograph, and wherein said triangularly shaped portion does not overly said confidential indicia.

12. An assembly as recited in claim 10 further comprising readable indicia imaged on said top surface of said face ply on a portion thereof not covered by said security pantograph, and wherein at least one of said slits or perforations passes through said readable indicia, causing said face ply to separate into different portions each containing only part of said readable indicia when said pseudo adhesion layers are separated.

13. An assembly as recited in claim 1 wherein said security pantograph comprises overlaid pantographs of blue and black ink.

14. A tamperproof label assembly for camouflaging or clearly evidently displaying confidential indicia, comprising:

an image ply having top and bottom surfaces, said top surface for generating an image in the form of confidential indicia when impacted with an impact printer stylus;

a face ply having top and bottom surfaces, and having a security pantograph imaged on said top surface thereof;

pseudo adhesion layers disposed between said face ply bottom surface and said image ply top surface for releasably holding said face and image plies together, but when separated exposing said image ply top surface without damage thereto, and once separated not capable of re-adhesion in as effective a manner as prior to separation; and lines of weakness or parting formed in said face ply and one of said pseudo adhesion layers for effecting separation of portions of said face ply when said pseudo adhesion layers are separated, precluding effective reattachment of said pseudo adhesion layers once separated due to said separation.

15. An assembly as recited in claim 14 wherein said lines of weakness or parting include a diagonal slit cooperating with a longitudinal slit and defining a triangularly shaped portion of said face ply; and wherein said top surface of said triangularly shaped portion of said face ply has printing thereon of a distinctly different color than said security pantograph.

16. An assembly as recited in claim 14 further comprising readable indicia imaged on said top surface of said face ply, on a portion thereof not covered by said security pantograph; and wherein at least one of said lines of weakness or parting passes through said readable indicia, causing said face ply to separate into different portions each containing only part of said readable indicia when said pseudo adhesion layers are separated.

17. An assembly as recited in claim 14 wherein said lines of weakness or parting include a plurality of generally L-shaped slits, at least one longitudinal slit, and at least one longitudinal perforation.

18. An assembly as recited in claim 14 wherein said security pantograph comprises overlaid pantographs of blue and black ink.

19. An assembly as recited in claim 1 wherein said image ply top surface comprises a self-contained self-imaging coating.

20. An assembly as recited in claim 14 wherein said image ply top surface comprises a self-contained self-imaging coating.

* * * * *